(12) United States Patent
Borges et al.

(10) Patent No.: US 7,419,435 B2
(45) Date of Patent: Sep. 2, 2008

(54) COMPOSITE TORQUE TUBE CAPTURED END FITTING

(75) Inventors: John S. Borges, Huntington Beach, CA (US); Vail R. Trevisanut, Redondo Beach, CA (US); David R. Scarr, Lakewood, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 295 days.

(21) Appl. No.: 11/371,791

(22) Filed: Mar. 9, 2006

(65) Prior Publication Data

US 2007/0213136 A1    Sep. 13, 2007

(51) Int. Cl.
*F16C 1/02* (2006.01)
(52) U.S. Cl. ..................... 464/181; 464/183
(58) Field of Classification Search ......... 464/119, 464/181–184; 403/383, 13, 14; 180/380; 138/DIG. 11
See application file for complete search history.

(56) References Cited

U.S. PATENT DOCUMENTS

| | | | |
|---|---|---|---|
| 1,379,760 A * | 5/1921 | Harris | ......................... 464/184 |
| 4,259,382 A | 3/1981 | Schwan | |
| 4,358,284 A | 11/1982 | Federmann et al. | |
| 4,704,918 A * | 11/1987 | Orkin et al. | ............. 464/181 X |
| 4,867,824 A | 9/1989 | Gill et al. | |
| 4,932,924 A | 6/1990 | Lobel | |
| 5,165,303 A * | 11/1992 | Riemscheid et al. | |
| 5,309,620 A | 5/1994 | Shinohara et al. | |
| 5,322,580 A | 6/1994 | McIntire et al. | |
| 5,395,333 A * | 3/1995 | Brill | |
| 5,421,781 A | 6/1995 | Mackellar | |
| 5,553,964 A | 9/1996 | Rouillot | |
| 5,601,493 A | 2/1997 | Nakazono et al. | |
| 6,056,018 A * | 5/2000 | Renaud | ............... 138/DIG. 11 |
| 6,190,263 B1 | 2/2001 | Kimoto et al. | |
| 6,350,204 B1 | 2/2002 | Yasui et al. | |
| 7,320,381 B2 * | 1/2008 | Patrascu et al. | ........ 464/183 X |
| 2004/0082394 A1 * | 4/2004 | Lee et al. | .................... 464/182 |
| 2005/0153783 A1 * | 7/2005 | Williams | .................... 464/182 |

* cited by examiner

*Primary Examiner*—Greg Binda
(74) *Attorney, Agent, or Firm*—Stetina Brunda Garred & Brucker

(57) ABSTRACT

A torque tube assembly includes a hollow composite member and an end fitting. The composite member has at least one end portion divided into a forward section and an aft section. The forward section is disposed adjacent a free end of the composite member. Each one of the forward and aft sections has at least one lobe extending radially outwardly along a lobe axis. The lobe axis of the forward section is preferably angularly offset from the lobe axis of the aft section. The end fitting is formed complementary to the composite member and is at least partially enclosed by the forward and aft sections.

15 Claims, 3 Drawing Sheets

COMPOSITE TORQUE TUBE CAPTURED END FITTING

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The following invention relates to composite structures and, more particularly, to a uniquely configured composite torque tube end fitting design that is specifically adapted to provide increased resistance to axial and torque loads.

The prior art includes many structural configurations wherein torque from one member is transferred to another member. For example, an automobile driveshaft is configured to transmit torque between an engine and driving wheels. Similarly, driveshafts may be incorporated into various types of aircraft and seagoing ships. Driveshafts are generally comprised of elongate rod or tubing having end fittings specifically configured to be connected to transmission devices.

With an increasing demand for more efficient structures, there has been a trend away from metallic structures in favor of composite structures. In the quest for lightweight structures that can efficiently transmit static and dynamic loads, composites possess many favorable characteristics. For example, a composite driveshaft may have a weight reduction of one-half to one-quarter the weight of a conventional metallic driveshaft of the type that is commonly used in motor vehicles. Other benefits of using composites in driveshafts lies in improved mechanical properties including improved modulus of velocity, density, flexural rigidity, and/or torsional rigidity.

Advantageously, composites also allow for fine tuning of certain ones of these mechanical properties for a given application by merely changing the arrangement of the basic elements. For example, by changing the angle of orientation of load-carrying fibers embedded in the composite material, the stiffness of a torque-carrying composite assembly can be altered. The capability to tune such mechanical characteristics is especially important in aerospace applications wherein weight reduction is a critical factor. Dynamic loading applications for torque tube assemblies includes control rods, torque rods, torque shafts. Static loading applications for torque tube assemblies includes numerous structural elements such as aircraft wing struts.

Prior art composite torque tube designs rely upon circular end fittings that are inserted into a free, open end of a composite laminate torque member. An adhesive bond may be provided between the end fitting and the composite member in order to improve the torque carrying capability of the torque tube. Unfortunately, the greater the amount of axial or torque loads that is applied to the torque tube, the larger the amount of surface area that is required in order to accommodate such higher loads. As a result, applications of extremely high axial or torque loads necessitate the use of end fittings that extend along a large portion of the composite member. Unfortunately, the end fittings are increased in length merely for the purpose of increasing the amount of available adhesive bond area between the end fitting and the composite member.

In extreme circumstances, and depending upon the length of the composite member, the amount of adhesive bond area required in order to adequately transmit torque loads necessitates that end fitting on either end of the composite tube eventually extends along its entire length. Such extreme lengths of the end fittings inside the composite member negates any benefit gained through the use of the lightweight composite materials in torque tube assemblies. The resulting structure may be more time-consume and costly to manufacture that a metallic version constructed in accordance with prior art design practices.

Attempts to increase the torque and axial load-carrying capability of composite torque tube designs included the use of a pin or fastener inserted radially or diametrically through the composite tube member and the end fitting. However, as is well known in the art of composite construction, forming a hole in a composite structure oftentimes results in severing one or more of the load carrying fibers within the composite tube. Furthermore, the act of forming a hole in the composite member is sometimes expensive and time consuming due to the need for specialized drilling equipment to prevent breaking or severing the resin and fiber elements around the hole. Finally, the addition of a pin or fastener to aid in transmitting a portion of the torque from the end fitting to the tube member is not an optimized lightweight solution.

Also included in the prior art are other attempts for improving transmissibility between end fittings and the composite tube member into which the end fitting is inserted. For example, special surface features may be provided on an outer surface of the end fitting in order to increase the engagable surface area between the end fitting and the interior of the composite tube. For example, serrations added to the end fitting may allow the end fitting to grasp the inner surface of the composite tube member in order to better transfer load. However, the need to form special surface features such as serrations on the outer surface of the end fitting presents additional machining challenges and increases fabrication costs. Furthermore, the serrations and surface features themselves may sever reinforcing fibers embedded within the resin matrix of the composite tube member thereby increasing the risk of a failure in the transmission of high torsional loads.

As can be seen, there exists a need in the art for a composite torque tube end fitting design that efficiently captures the end fitting within a composite tube and locks the end fitting inside the composite tube member using mechanical advantage. Furthermore, there exists a need in the art for a composite torque tube design that prevents relative rotation between the end fitting and the torque tube member during the application of torsional loads. Additionally, there exists a need in the art for composite torque tube design having axial loading capability in addition to torsional loading capability. Finally, there exists a need in the art for composite torque tube design that is of some simple construction and of low cost and which may be formed using simple manufacturing methods.

BRIEF SUMMARY OF THE INVENTION

The present invention specifically addresses and alleviates the above-referenced deficiencies associated with torque tubes of the prior art. More particularly, the present invention is a torque tube assembly comprising a hollow composite member having an end fitting inserted into a free end of the composite member. The free end may be divided into a forward section and an aft section. The end fitting includes lobes that are formed complementary to the composite member. The end fitting is at least partially encased by the forward and aft sections of the hollow composite member.

The hollow composite member may be a generally elongate tubular member having a tube axis. The forward and aft sections have a waist section disposed therebetween. Importantly, each one of the forward and aft sections has at least one lobe extending radially outwardly from the tube axis. The lobes define a lobe axis that extends generally perpendicularly from the tube axis. The lobe axis of the forward section is angularly offset from the lobe axis of the aft section. Because the lobes extend radially opposite from one another, an oval cross section is formed for each one of the forward and aft sections of the composite member. Therefore, the oval cross section of the forward section is angularly offset from the oval cross section of the aft section.

The waist section between the forward and aft sections may have a circular cross section which aids in resisting axial loads applied to the end fitting and thereby prevents the end fitting from pulling out of the composite member at the free end. The opposed oval cross sections of the forward and aft sections resists rotation of the end fitting inside the composite member during the application of torque loads on the end fitting. The end fitting may taper radially inwardly to a circular cross section at the end face to provide better axial loading capability to the torque tube assembly.

The composite member may be comprised of fiber elements embedded in a matrix or resin material. During fabrication of the composite member, such fiber elements are preferably aligned with the predicted load path. More specifically, the fiber elements are preferably placed in mechanical tension loading (i.e., pulling the fibers) as torque loads are applied to the end fitting. By dividing the composite member into two sections near the end fitting, axial loading capability as well as torque loading capability of the torque tube assembly is enhanced by angular offset between the aft section lobes in relation to the forward section lobes. Torque and axial loading capability of the torque tube assembly may be improved by providing a layer of adhesive between the inner surface of the forward and aft sections and the outer surface of the end fitting.

The angular offset of cross-sectional shapes of the forward and aft section provides a mechanical advantage which better resists torque loading between the composite member and the end fitting. The mechanical advantage results from the composite member resisting rotation due to the lobes in the end fitting. The composite member may be fabricated from any fiber matrix material including graphite material, fiberglass material and Kevlar material. The end fitting may be formed of any material but is preferably a metallic material such as aluminum.

The end fitting may include a bore formed therethrough or a threaded hole into which mechanical attachments may be threadably engaged. Optionally, the torque tube assembly may have a function section extending axially outwardly from the forward section. The function section may be formed as a cylindrical extension having a splined portion for engaging splines of a driveshaft or similar torque transmitting member.

The torque tube assembly may be fabricated using the end fitting in conjunction with a mandrel tool held in alignment with the end fitting such that the composite member may be filament-wound over the end fitting and over the mandrel. After winding and curing, a dissolving liquid may be flushed through the bore of the end fitting in order to dissolve the mandrel tool leaving the composite member with the end fitting being captured within the composite member.

BRIEF DESCRIPTION OF THE DRAWINGS

These as well as other features of the present invention will become more apparent upon reference to the drawings wherein:

FIG. 5b is an end view of the torque tube assembly shown in FIG. 1 and illustrating the difference in ovalization as compared to FIG. 5a;

DETAILED DESCRIPTION OF THE INVENTION

Figure 1:
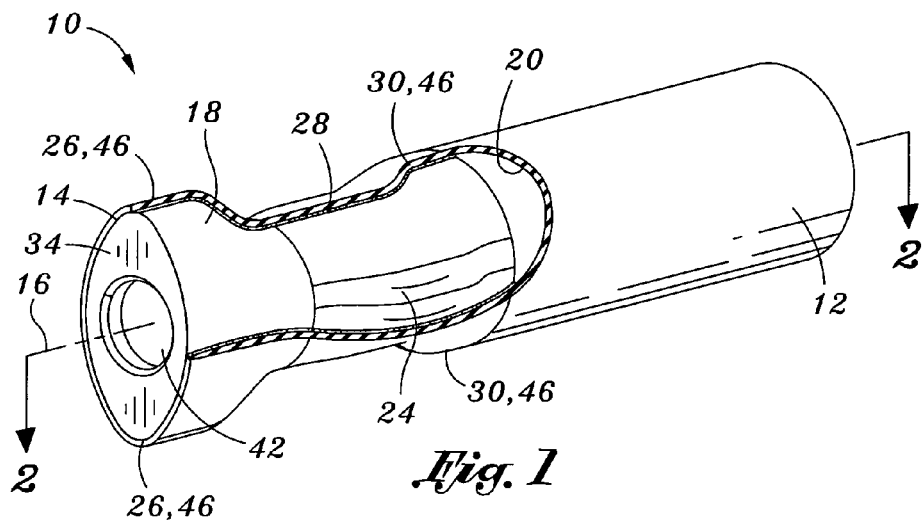
FIG. 1 is a perspective view of a torque tube assembly of the present invention illustrating an end fitting encased within a hollow composite member.
Figure 2:
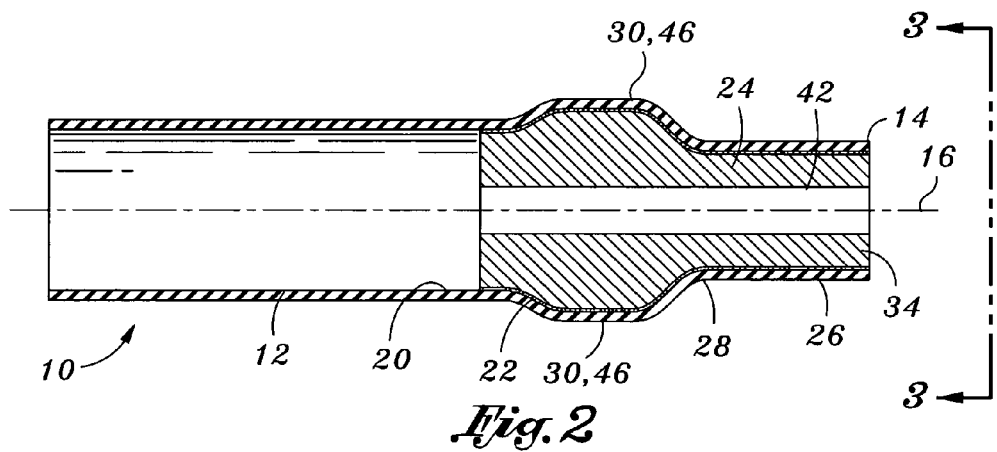
FIG. 2 is a cross sectional view of the torque tube assembly taking along line 2-2 of FIG. 1 and illustrating a forward section, a waist section, and an aft section of the composite tube assembly and illustrating the end fitting being formed complementary thereto.
Figure 3:
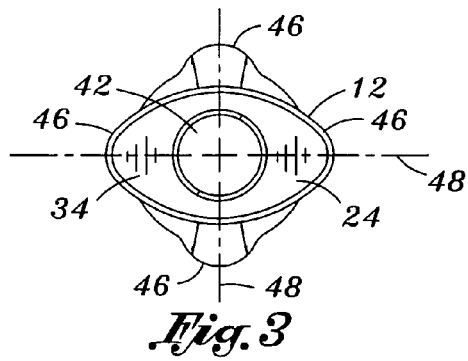
FIG. 3 is an end view of the torque tube assembly of FIG. 1.

Referring now to the drawings wherein the showings are for purposes of illustrating the present invention and not for purposes of limiting the same, provided is a torque tube assembly 10 which, as shown in FIGS. 1-3, comprises a hollow composite member 12 having at least one end portion with an end fitting 24 inserted thereinto. More specifically, the end fitting 24 is formed with a shaped that complementary to the composite member 12 and is at least partially enclosed or encased by forward and aft sections 26, 30 of the hollow composite member 12.

The hollow composite member 12 may be defined as a generally elongate tubular member having a tube axis 16, an inner surface 20 and an outer surface 18. The composite member 12 includes at least one free end 14 into which the end fittings 24 may be inserted. As shown in FIGS. 1-3, the free end 14 of the hollow composite members 12 is also divided into forward and aft sections 26, 30 with a waist section 28 being disposed between the forward and aft sections 26, 30.

Importantly, each one of the forward and aft sections 26, 30 of the composite member 12 has at least one lobe 46 extending radially outwardly therefrom along a lobe axis 48. The lobe axis 48 extends generally laterally outwardly, such as perpendicularly, from the tube axis 16. As shown in FIGS. 1-3, it is contemplated that each one of the forward and aft sections 26, 30 of the composite member 12 have a pair of lobes 46 which are disposed radially or diametrically opposite one another along the respective ones of the lobe axes 48. As can be seen in the Figures, the lobe axis 48 of the forward section 26 is angularly offset from the lobe axis 48 of the aft section 30. Because the lobes 46 extend radially opposite from one another, an oval cross section is formed for each one of the forward and aft sections 26, 30 of the composite member 12. In this manner, the oval cross section of the forward section 26 is angularly offset from the oval cross section of the aft section 30.

As was earlier mentioned, the waist section 28 is disposed between the forward and aft sections 26, 30. In the waist section 28, the oval cross sections of the forward and aft sections 26, 30 transitions to a narrowed cross section which may be a circular cross section in the waist section 28. Due to the unique arrangement wherein the lobe axis 48 of the forward and aft sections 26, 30 are angularly offset relative to one another, the torque tube assembly 10 of the present invention uses mechanical advantage to capture and lock the end fitting 24 inside the composite member 12. Furthermore, the waist section 28 prevents the end fitting 24 from pulling out of the composite member 12 at the free end 14.

The lobes 46 in the forward and aft sections 26, 30 are specifically configured to resist torque loading in the torque tube assembly 10 by restricting rotational movement of the end fitting 24 relative to the composite member. More specifically, due to the complementary shape of the end fitting 24 with the composite member, rotational movement of the end fitting 24 is effectively prevented. In this regard, the outer surface of the lobes 46 bear against the inner surface of the composite member at the interface between the lobes 46 and the composite member and utilize mechanical advantage to resist torsional movement therebetween.

Figure 7:
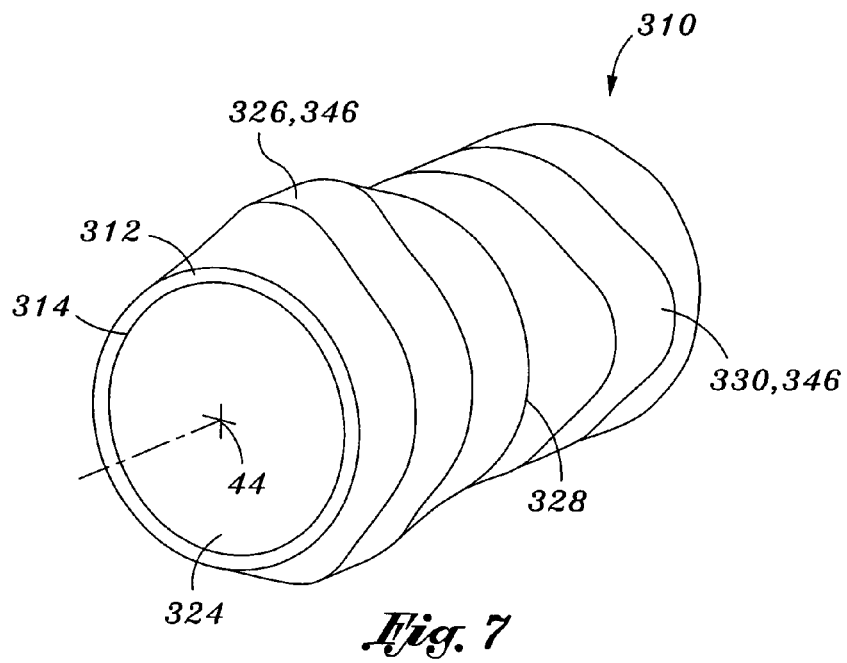
FIG. 7 is the torque tube assembly in a further embodiment wherein lobes of the composite member and end fitting taper inwardly into a circular cross sectional shape at a free end of the forward section.

The opposed oval cross sections of the forward and aft sections 26, 30 also prevents the end fitting 24 from rotating relative to the composite member 12 during the application of torque loads on the end fitting 24. Referring to FIG. 7, there is shown a torque tube assembly 310 having a hollow composite member 312. An end fitting 324 is formed with a shape that is complementary to the composite member 312 and is at least partially enclosed or encased by forward and aft sections 326,330 of the hollow composite member 312. The composite member 312 includes at least one free end 314 into which the end fittings 324 may be inserted. The free end 314 is divided into forward and aft sections 326,330 with a waist section 328 being disposed between the forward and aft sections 326, 330. Each one of the forward and aft sections 326,330 has at least one lobe 346 extending radially outwardly therefrom. The end fitting 324 of the forward section 326 may taper radially inwardly to a circular cross section at the end face 334. By including the transition between the oval cross section to the circular cross section at the end face 334, the torque tube assembly 310 has better axial loading capability.

In this manner, the lobes 46 in the forward and aft sections 26, 30 are specifically configured to resist axial loading in the torque tube assembly 10 by restricting axial movement of the end fitting 24 relative to the composite member. In the same manner as was mentioned above with regard to resisting torque loading, due to the complementary shape of the end fitting 24 with the composite member 12, axial movement of the end fitting 24 is effectively prevented. The lobes 46 bear against forward and aft sides of the inner surfaces of the composite member 12 at the interface between the lobes 46 and the composite member 12 and utilize mechanical advantage to resist axial movement therebetween.

More particularly, fiber elements which may be embedded in the composite member 12 resin are preferably aligned with the direction of loading. Such fiber elements are placed and oriented in the matrix during fabrication of the composite member 12. In this manner, the fiber elements are preferably placed in mechanical tension loading (i.e., pulling the fibers) as torque loads are applied to the end fitting 24. By dividing the composite member 12 into two sections near the end fitting 24, axial loading capability as well as torque loading capability of the torque tube assembly 10 is enhanced by angular offset between the aft section 30 lobes 46 in relation to the forward section 26 lobes 46. As shown in FIG. 1-3, the forward section 26 is offset generally 90 degrees relative to the aft section 30. However, it is contemplated that the forward section 26 may be angularly offset in any amount relative to the aft section 30.

Furthermore, although the figures show only a pair of the lobes 46 in diametric opposition to one another in each of the forward 26 and aft sections 30, it is contemplated that any number of lobes 46 may be provided in each one of the forward and aft sections 26, 30 and at any angular spacing. For example, it is contemplated that the lobes 46 may be provided in a tri-oval configuration wherein three lobes 46 are disposed at angular spacings of 180 degrees relative to one another. Any number of lobes 46 may be provided in each of the forward and aft sections 26, 30 and the lobes 46 may be arranged in any angular spacing.

Referring still to FIGS. 1-3, the end fitting 24 is shown having an outer surface 18 and is formed complementary to the composite member 12. The end fitting 24 is at least partially encased by the inner surface 20 of the forward and aft sections 26, 30 of the composite member 12. Torque and axial loading capability of the torque tube assembly 10 may be improved by providing an adhesive layer 22 between the inner surface 20 of the forward and aft sections 26, 30 and the outer surface 18 of the end fitting 24

Such adhesive may be comprised of an epoxy adhesive although various types of other adhesives may be used. As can be seen in the figures, the aft section 30 of the composite member 12 generally transitions into a generally hollow, cylindrically shaped portion of the composite member 12 to define a tube member. It should be noted that the aft section 30 may transition into a variety of alternative shapes for the remaining portions of the composite member 12. However, the cylindrical shape may be preferred in that it is generally known that cylindrical cross sectional shapes provide an efficient load path for torque applications.

Figure 4:
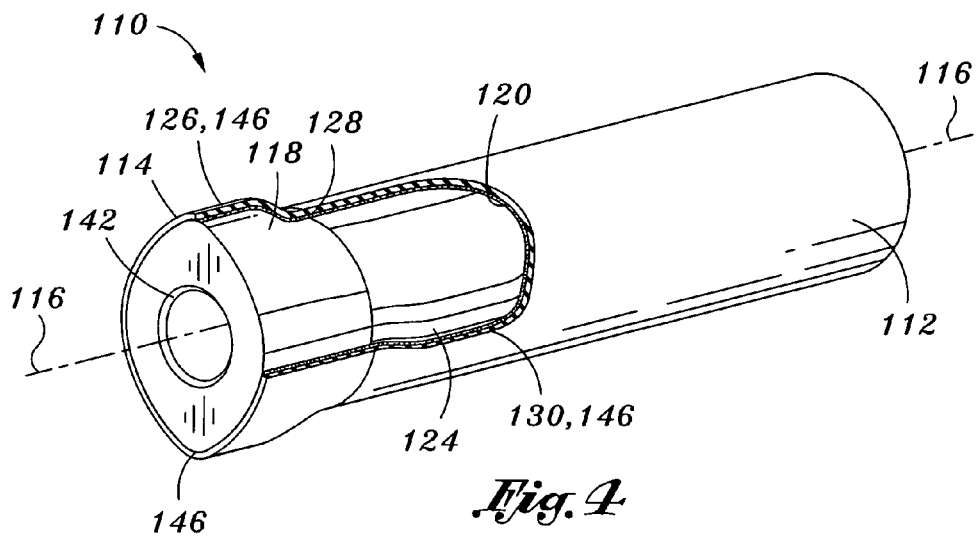
FIG. 4 is a perspective view of the torque tube assembly illustrating a less ovalized sectional shape of the forward and aft sections that that which is illustrated in FIG. 1.
Figure 5A:
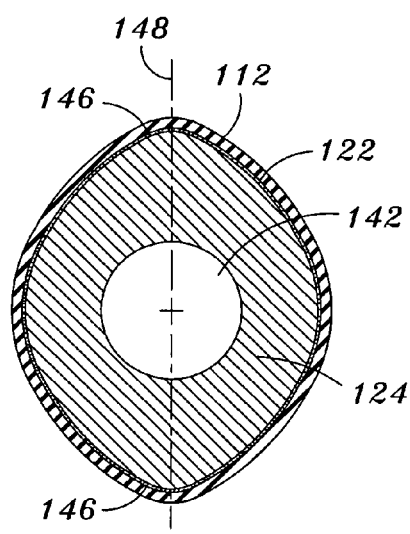
FIG. 5a is an end view of the torque tube assembly shown in FIG. 4 and illustrating the less ovalized shape of the torque tube in relation to that shown in FIG. 1.
Figure 5B:
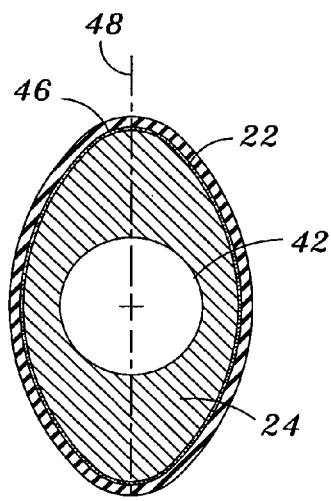

Regarding the particular cross sectional shapes of the aft section 30 and forward section 26, the degree of ovality of each of the forward and aft sections 26, 30 may be varied according to the particular application for which the torque tube assembly 10 is used. For example, in applications wherein torque loads are predicted to be higher than the axial loads, it is contemplated that a higher degree of ovality may be desired in order to better resist the torque loads. Examples of differences in ovality are apparent by comparing the torque tube assembly 10, as shown in FIGS. 1-3 and 5b to the torque tube assembly 110, shown in FIGS. 4 and 5a. Torque tube assembly 110 includes a hollow composite member 112 having at least one end portion with an end fitting 124 inserted thereinto. The end fitting 124 is formed with a shaped that complementary to the composite member 112 and is at least partially enclosed or encased by forward and aft sections 126, 130 of the hollow composite member 112. The hollow composite member 112 includes a tube axis 116, an inner surface 120 and an outer surface 118. The composite member 112 includes at least one free end 114 into which the end fittings 124 may be inserted. As shown in FIG. 4, the free end 114 of the hollow composite member 112 is also divided into forward and aft sections 126, 130 with a waist section 128 being disposed between the forward and aft sections 126, 130. Each one of the forward and aft sections 126, 130 of the composite member 112 has at least one lobe 146 extending radially outwardly therefrom along a lobe axis 148. The lobe axis 148 extends generally laterally outwardly, such as perpendicularly, from the tube axis 116.

As was earlier mentioned, skewing the forward and aft section 26, 30 provides mechanical advantage to resist torque loading between the composite member 12 and the end fitting 24. Therefore, the torque tube assembly 110 shown in FIGS. 1-3 may provide more mechanical advantage than the torque tube assembly 110 shown in FIG. 4. The mechanical advantage results from the composite member 12 resisting rotation due to the lobes 46 in the end fitting 24. As the oval cross section becomes flatter, the mechanical advantage becomes greater between the composite member 12 and the end fitting 24. Torque loading capability may be further increased by providing an adhesive layer 22 between the end fitting 24 and the composite member 12.

Regarding material from which the composite member 12 may be fabricated, it is contemplated that any fiber matrix material may be used including, but not limited to, graphite material, fiberglass material and aramid material, commonly sold by DuPont under the trademark, Kevlar®. The end fitting 24 may be formed of any material but preferably is formed of a metallic material. Such metallic materials may include aluminum such as aircraft grade aluminum, titanium, steel and other materials and/or combinations thereof. Preferably, the chosen material for the end fitting 24 is compatible (i.e., galvanic corrosion resistance, compatible coefficients of thermal expansion, etc.) with the chosen material for the composite member 12.

Figure 6:
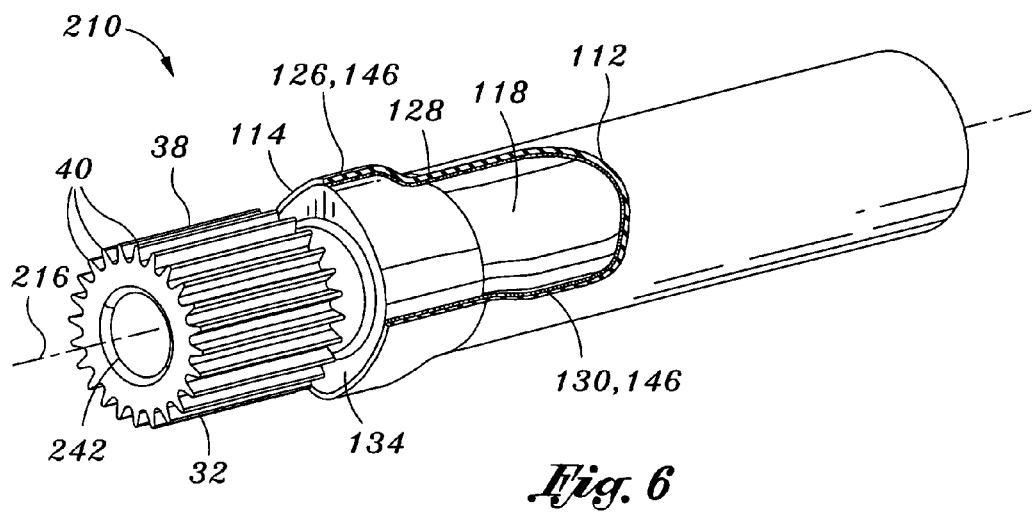
FIG. 6 is a perspective view of the torque tube assembly and illustrating a function section extending axially outwardly from the forward section of the end fitting.

As can be seen in FIGS. 1-7, the end fittings 24, 124 may include a bore 42, 142, respectively, formed therethrough and which may be aligned with the tube axis 16, 116. Alternatively, the end face 34 of the end fitting 24 may include a threaded hole 44 formed axially therein and into which mechanical attachments may be threadably engaged. Referring now to FIG. 6; there is shown a torque tube assembly 210 similar to the one shown in FIG. 4; however, the torque tube assembly 210 shown in FIG.6 includes a function section 32 extending axially outwardly from the forward section 26. The function section 32 may be integrally machined with the end fitting 124 and may generally extend axially outwardly from the end face 134. The torque tube assembly 210 also defines tube axis 216 and bore 242.

In its broadest sense, the function section provides a means to accommodate various types of attachments to the torque tube assembly. For example, the function section may be configured as a mating half of a universal joint assembly or as any integrally machined configuration that provides a connection for the torque tube assembly. In this regard, the function section may be configured in a wide variety of shapes and sizes. In a further example shown in FIG. 6, the function section 32 may be formed as a cylindrical extension 36 having a splined portion 38 with splines 40 formed thereabout. The splines 40 may be formed on an outer surface 18 of the splined portion 38 or may be formed on an inner surface 20 of the splined portion 38. Such splines 40 may be provided in order to mesh with splines of a driveshaft or other similar torque-transmitting member. In this regard, it is contemplated that the torque tube assembly 10 may be installed as a torque shaft, driveshaft, torque rod and/or control rod. Likewise, it is contemplated that the torque tube assembly 10 may be utilized as a propeller shaft or driveshaft for motor driven systems.

Fabrication of the torque tube assembly 10 may be facilitated by first providing the end fitting 24 having the bore 42 passing axially therethrough along the tube axis 16. A dissolvable mandrel tool may then be used in conjunction with the end fitting 24. The mandrel tool may be sized and shaped complementary to and generally held in alignment with the end fitting 24 such that the composite member 12 may be filament-wound above the end fitting 24 and the mandrel. Once the composite member 12 is completed (i.e., wound and cured), a dissolving liquid may be flushed through the bore 42 of the end fitting 24 in order to dissolve the mandrel tool. The end result is the end fitting 24 being captured within the composite member 12 with the lobes 46 of the end fitting 24 being formed complementary to the lobes 46 of the composite member 12.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A torque tube assembly, comprising:
a rigid hollow composite member extending along a tube axis, the hollow composite member having an elongate tubular member defining opposing end portions, at least one end portion being divided into forward and aft sections, the forward section being disposed adjacent a free end of the composite member, each one of the forward and aft sections having at least one lobe extending radially outwardly along a lobe axis, the lobe axis of the forward section being angularly offset from the lobe axis of the aft section, each lobe defining an oval shaped cross section perpendicular to the tube axis, wherein the composite member is fabricated from at least one of graphite epoxy material, fiberglass material and aramid material; and
an end fitting being formed complementary to the composite member and being at least partially enclosed by the forward and aft sections.

2. The torque tube assembly of claim 1 wherein each one of the forward and aft sections includes a pair of the lobes disposed radially opposite one another along the respective ones of the lobe axes.

3. The torque tube assembly of claim 1 wherein the lobe axes of the forward and aft sections are angularly offset approximately ninety degrees relative to one another.

4. The torque tube assembly of claim 1 wherein the aft section transitions into a generally hollow cylindrically shaped portion of the composite member.

5. The torque tube assembly of claim 1 wherein the end fitting is fabricated of metallic material.

6. The torque tube assembly of claim 1 wherein the end fitting includes a bore formed axially therethrough.

7. The torque tube assembly of claim 1 wherein the end fitting includes a threaded hole formed axially therein.

8. The torque tube assembly of claim 1 wherein the end fitting includes a function section extending axially outwardly from the forward section.

9. The torque tube assembly of claim 8 wherein the function section has a splined portion with splines formed thereabout.

10. The torque tube assembly of claim 9 wherein the splines are formed on an outer surface of the splined portion.

11. The torque tube assembly of claim 1 wherein the lobe tapers inwardly into a circular cross section at the free end of the forward section.

12. The torque tube assembly of claim 1 wherein the hollow composite member defines a tube axis, the at least one lobe including two lobes diametrically opposed along the lobe axis to collectively define an ovular cross section perpendicular to the tube axis.

13. A torque tube assembly, comprising:
- a generally hollow elongate rigid composite member defining a tube axis and having an inner surface, the hollow composite member having an elongate tubular member defining opposing end portions, at least one end portion being divided into forward and aft sections having a waist section disposed therebetween, the forward section being disposed adjacent a free end of the composite member, each of the forward and aft sections having at least one lobe extending radially outwardly therefrom along a lobe axis such that the forward and aft sections each define an oval cross section, the lobe axis of the forward section being angularly offset from the lobe axis of the aft section such that the oval cross sections of the forward and aft sections are angularly offset relative to one another;
- an end fitting having an outer surface and being formed complementary and being at least partially encased by the inner surface of the forward and aft sections; and
- a layer of epoxy adhesive being disposed between the inner surface of the forward and aft sections and the outer surface of the end fitting.

14. The torque tube assembly of claim 13 wherein each one of the forward and aft sections includes a pair of the lobes disposed radially opposite one another along the respective ones of the lobe axes.

15. A torque tube assembly, comprising:
- a rigid hollow composite member extending along a tube axis, the hollow composite member having at least one end portion being divided into forward and aft sections, the forward section being disposed adjacent a free end of the composite member, each one of the forward and aft sections having at least one lobe extending radially outwardly, each lobe defining an oval shaped cross section perpendicular to the tube axis; and
- an end fitting being formed complementary to the composite member and being enclosed by the forward and aft sections;
- wherein the lobes are configured to resist torque loading by restricting rotational movement of the end fitting relative to the composite member;
- wherein the lobe in the forward section tapers inwardly into a circular cross section at the free end thereof and being configured to resist axial loading by restricting axial movement of the end fitting relative to the composite member.

* * * * *